(12) United States Patent
Zhang et al.

(10) Patent No.: US 10,560,949 B2
(45) Date of Patent: Feb. 11, 2020

(54) COMMUNICATION DEVICES AND METHODS THEREIN FOR ENABLING INTERFERENCE MANAGEMENT OF DATA TRANSMISSIONS IN A WIRELESS COMMUNICATIONS NETWORK

(71) Applicant: Telefonaktiebolaget LM Ericsson (publ), Stockholm (SE)

(72) Inventors: Zhan Zhang, Beijing (CN); Jonas Kronander, Knivsta (SE); Jinhua Liu, Beijing (CN); Edgar Ramos, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 122 days.

(21) Appl. No.: 15/503,663

(22) PCT Filed: Aug. 28, 2014

(86) PCT No.: PCT/CN2014/085416
§ 371 (c)(1),
(2) Date: Feb. 13, 2017

(87) PCT Pub. No.: WO2016/029406
PCT Pub. Date: Mar. 3, 2016

(65) Prior Publication Data
US 2017/0280461 A1    Sep. 28, 2017

(51) Int. Cl.
*H04W 72/08* (2009.01)
(52) U.S. Cl.
CPC ................ *H04W 72/082* (2013.01)
(58) Field of Classification Search
CPC .................................. H04W 72/082
See application file for complete search history.

(56) References Cited

U.S. PATENT DOCUMENTS

2003/0235179 A1* 12/2003 Tuomela ............... H04W 72/02
370/347
2006/0205413 A1* 9/2006 Teague .................. H04L 5/0087
455/452.1
(Continued)

FOREIGN PATENT DOCUMENTS

CN 101466149 A 6/2009
JP 2011259425 A 12/2011
(Continued)

OTHER PUBLICATIONS

Extended European Search Report for European Patent Application No. 14900862.5, dated Feb. 28, 2018, 6 pages.
(Continued)

*Primary Examiner* — Jael M Ulysse
(74) *Attorney, Agent, or Firm* — Sage Patent Group

(57) ABSTRACT

A second communication device transmits information relating to a request for a first set of radio resources of a radio channel for a first data transmission to a third communication device. This information is received by a first communication device. In response thereto, the first communication device transmits an interference notification to the second communication device when the received information relating to a request for radio resources of the radio channel is determined to conflict with requested radio resources of the radio channel for a second data transmission to or from the first communication device. The second communication device receives an interference notification from the first communication device indicating that its transmitted information relating to a request for radio resources of the radio channel has been determined to conflict with requested radio resources of the radio channel for the second data transmission to or from the first communication device.

24 Claims, 3 Drawing Sheets

(56) References Cited

U.S. PATENT DOCUMENTS

| | | | |
|---|---|---|---|
| 2007/0153684 A1* | 7/2007 | Choi | H04W 72/06 370/229 |
| 2009/0016295 A1* | 1/2009 | Li | H04L 5/0007 370/330 |
| 2009/0232034 A1 | 9/2009 | Li et al. | |
| 2009/0237255 A1 | 9/2009 | Rofougaran | |
| 2009/0253449 A1* | 10/2009 | Gupta | H04W 72/082 455/509 |
| 2009/0290560 A1* | 11/2009 | Feng | H04W 72/082 370/336 |
| 2010/0202391 A1* | 8/2010 | Palanki | H04W 72/0426 370/329 |
| 2011/0013651 A1 | 1/2011 | Lanzone et al. | |
| 2011/0086642 A1* | 4/2011 | Lee | H04W 74/0833 455/445 |
| 2011/0116393 A1* | 5/2011 | Hong | H04W 72/082 370/252 |
| 2011/0117853 A1 | 5/2011 | Franklin | |
| 2011/0136518 A1 | 6/2011 | Hsu et al. | |
| 2011/0195704 A1* | 8/2011 | Choi | H04L 5/14 455/423 |
| 2011/0292890 A1* | 12/2011 | Kulkarni | H04W 72/0426 455/450 |
| 2012/0203860 A1 | 8/2012 | Valerius et al. | |
| 2012/0214525 A1* | 8/2012 | Fujii | H04B 1/005 455/502 |
| 2012/0243431 A1* | 9/2012 | Chen | H04W 72/0406 370/252 |
| 2012/0281580 A1* | 11/2012 | Lee | H04W 74/008 370/252 |
| 2012/0282889 A1* | 11/2012 | Tanaka | H04J 11/0053 455/405 |
| 2013/0083779 A1* | 4/2013 | Ahn | H04W 72/04 370/336 |
| 2013/0090127 A1* | 4/2013 | Nishikawa | H04W 72/1215 455/452.1 |
| 2013/0148566 A1* | 6/2013 | Doppler | H04W 72/005 370/312 |
| 2013/0163532 A1* | 6/2013 | Anderson | H04W 72/04 370/329 |
| 2013/0272262 A1* | 10/2013 | Li | H04W 28/02 370/330 |
| 2014/0003360 A1* | 1/2014 | Novak | H04W 72/082 370/329 |
| 2014/0057637 A1* | 2/2014 | Hoang | H04W 56/0045 455/445 |
| 2014/0057670 A1* | 2/2014 | Lim | H04W 8/005 455/509 |
| 2014/0237547 A1 | 8/2014 | Bose | |
| 2014/0324974 A1* | 10/2014 | Park | H04W 72/02 709/204 |
| 2015/0208441 A1* | 7/2015 | Yoo | H04W 74/0816 370/338 |
| 2015/0215903 A1* | 7/2015 | Zhao | H04W 72/04 370/329 |
| 2016/0021654 A1* | 1/2016 | Batchu | H04W 72/0446 370/336 |
| 2017/0006633 A1 | 1/2017 | Zhang et al. | |

FOREIGN PATENT DOCUMENTS

| | | |
|---|---|---|
| JP | 2012005086 A | 1/2012 |
| JP | 2012175517 A | 9/2012 |
| KR | 20130092097 A | 8/2013 |
| WO | 2009148410 A1 | 12/2009 |
| WO | 2012087694 A1 | 6/2012 |

OTHER PUBLICATIONS

Notification of Reasons of Refusal for Korean Patent Application No. 10-2017-7008451, dated Apr. 11, 2018, 12 pages.

International Search Report and Written Opinion for International Patent Application No. PCT/CN2014/085416, dated May 29, 2015, 7 pages.

Notice of Reasons for Rejection for Japanese Patent Application No. 2017-511726, dated May 15, 2018, 6 pages.

Decision to Grant for Japanese Patent Application No. 2017-511726, dated Jan. 15, 2019, 6 pages.

* cited by examiner

COMMUNICATION DEVICES AND METHODS THEREIN FOR ENABLING INTERFERENCE MANAGEMENT OF DATA TRANSMISSIONS IN A WIRELESS COMMUNICATIONS NETWORK

This application is a 35 U.S.C. § 371 national phase filing of International Application No. PCT/CN2014/085416, filed Aug. 28, 2014, the disclosure of which is incorporated herein by reference in its entirety.

TECHNICAL FIELD

Embodiments herein relate to inference management of data transmissions in a wireless communications network. In particular, embodiments herein relate to communication devices and methods therein for enabling interference management of data transmissions from one communication device to another communication device in a wireless communications network.

BACKGROUND

In a typical wireless communications network, communication devices, also known as wireless devices, mobile stations, terminals, and/or User Equipments, UEs, communicate via an access network, e.g. a Radio Access Network, RAN, with one or more core networks. The access network may cover a geographical area which is divided into cell areas, with each cell area being served by a network node, e.g. an access point, AP, or a base station. A cell is a geographical area where radio coverage is provided by the network node at a node site, or an antenna site in case the antenna and the radio base station are not collocated. Each cell is identified by an identity within the local radio area, which is broadcast in the cell. One network node may have one or more cells. The network nodes communicate over the air interface operating on radio frequencies with the communication devices within range of the network nodes. Note that, hereinafter, network nodes or base stations may also be referred to as communication devices.

An Ultra Dense Network, UDN, comprise a large number of densely deployed radio base stations or network nodes. Hence, UDN network nodes have to possess a strong capability to handle the interference. Further, a UDN network conventionally operates over millimetre wave, mmW, frequencies because of the potential of using wide bandwidth. However, beamforming with a large number of antenna elements is normally required in this case in order to ensure the coverage as mmW frequencies experiences severe fading.

Based on these prerequisites, in order to get the channel information to enable beamforming, beacon signals needs to be transmitted according to predefined beam patterns. For example, a beacon signal sweeping with repeated information in different beam directions may be applied to cover the entire desired coverage range. Thereafter, data transmission may be transmitted using trained beams, which has a narrower beam-width than that of current wireless communications networks.

It should be noted that it is advantageous for the densely deployed UDN network nodes to be capable of adaptively cooperating in order to avoid interference for data transmissions in the UDN network. Interference avoidance in both intra-UDN networks and/or inter-UDN networks is also, in the context of dynamic beamforming based transmissions, important at a Media Access Control, MAC, level. Therefore, an efficient MAC protocol emphasizing this aspect is needed to be developed for UDN networks in order to meet the abovementioned requirements.

Currently, the IEEE-802.11 system dominates the unlicensed frequency band. It is valuable to have a brief view of IEEE-802.11 radio resource management when discussing MAC protocols for UDN networks.

In recent standards of IEEE 802.11, the communication devices are competing about the radio resources via a mechanism referred to as "listen before talk". This means that a communication device may transmit a signal only when the detected transmission power level is lower than a certain predefined threshold. This is performed in order to avoid collision of signals. This may, for example, be implemented using the so-called Distributed Coordination Function, DCF, wherein each communication device waits a random back-off time before accessing the radio channel, thus allowing other communication devices to get a fair chance to access the radio channel. If a second communication device node has a random back-off time that becomes zero before the first communication device, the first communication device may determine that the second communication device has started transmitting. Consequently, the first communication device postpones its data transmission. At the next transmission possibility, the first communication device continues to count down the random back-off time until it is zero. When the back-off time expires, i.e. the back-off timer becomes zero, the first communication device attempts to perform its data transmission. Upon a collision, the communication devices may increase, e.g. up to a certain limit, their sensing time, e.g. back-off time, in order to avoid further collision to a large extent.

However, this also means that first and second communication device wanting to transmit data, thus contending for the radio channel, e.g. using the DCF or any other form of carrier sensing, and therefore are listening to the radio channel, may not be able to hear each other due to, for example, directive data transmissions of the other communication device. This may result in that, for example, if both the first and second communication devices want to communicate with the same third communication device, the first and second communication devices direct their respective radio transmission beams towards the common third communication device, whereby a collision occurs. This is an example of what is commonly referred to as the hidden node problem, i.e. that two transmitting communication devices are hidden from each other.

In order to reduce the hidden node problem, the above mechanism may be complemented by Request to Send, RTS, and Clear to Send, CTS, signalling. This signalling means that a communication device that intents to transmit data sends out an RTS signal, and only if it also receives a CTS it will start with the actual data transmission.

As indicated above, an IEEE-802.11 system using DCF (with or without RTS/CTS signalling) provides each communication device with an opportunity to get the radio resource. However, while such system works well when the data traffic is low, the radio resource efficiency will become low when the data traffic is high because of an increased number of collisions, i.e. higher data traffic infers an increased probability of collisions. In brief, it may be shown that the IEEE-802.11 using DCF does not scale too well with increasing number of contending communication devices and offered data traffic. This will most likely occur in UDN networks.

PCT/SE2013/051562 describes a MAC protocol for UDN networks. In this case, the radio resources are split between control and data for a contention-based MAC of the UDN network. That is, the total radio resource is split for control and data channels, where communication devices contend to reserve the resource blocks for data transmissions, while data-transmission is done at another separate radio resource portion other than that of the control channel. Hence, in most cases, when the data bandwidth is much greater than that of the control bandwidth, a minimized or reduce number of conflicts will occur on the data channel and most of the contention will instead happen at the narrow separated control channel. This results in a better overall channel efficiency.

However, while this MAC protocol provides a solution which at least partially mitigates the hidden node problem, it is still necessary to further provide a MAC protocol which may improve the interference management in a wireless communications network.

SUMMARY

It is an object of embodiments herein to improve interference management in a wireless communications network.

According to a first aspect of embodiments herein, the object is achieved by a method performed by a first communication device for enabling interference management of data transmissions from a second communication device to a third communication device in a wireless communications network. The first communications device receives information relating to a request for radio resources of a radio channel for a first data transmission from the second communication device to the third communication device. Then, the first communication device transmits an interference notification to the second communication device when the received information relating to a request for radio resources of the radio channel is determined to conflict with requested radio resources of the radio channel for a second data transmission to or from the first communication device.

According to a second aspect of embodiments herein, the object is achieved by a first communication device for enabling interference management of data transmissions from a second communication device to a third communication device in a wireless communications network. The first communication device is configured to receive information relating to a request for radio resources of a radio channel for a first data transmission from the second communication device to the third communication device. Also, the first communication device is configured to transmit an interference notification to the second communication device when the received information relating to a request for radio resources of the radio channel is determined to conflict with requested radio resources of the radio channel for a second data transmission to or from the first communication device.

According to a third aspect of embodiments herein, the object is achieved by a method performed by a second communication device for enabling interference management of data transmissions from the second communication device to a third communication device in a wireless communications network. The second communication device transmits information relating to a request for a first set of radio resources of a radio channel for a first data transmission to the third communication device. Then, the second communication device receives at least one interference notification from at least one first communication device indicating that the transmitted information relating to a request for radio resources of the radio channel has been determined to conflict with requested radio resources of the radio channel for at least one second data transmission to or from the at least one first communication device.

According to a fourth aspect of embodiments herein, the object is achieved by a second communication device for enabling interference management of data transmissions from the second communication device to a third communication device in a wireless communications network. The second communication device is configured to transmit information relating to a request for a first set of radio resources of a radio channel for a first data transmission to the third communication device. Also, the second communication device is configured to receive at least one interference notification from at least one first communication device indicating that the transmitted information relating to a request for radio resources of the radio channel has been determined to conflict with requested radio resources of the radio channel for at least one second data transmission to or from the at least one first communication device.

According to a fifth aspect of embodiments herein, the object is achieved by a computer program, comprising instructions which, when executed on at least one processor, cause the at least one processor to carry out one of the methods described above. According to a sixth aspect of embodiments herein, the object is achieved by a carrier containing the computer program described above, wherein the carrier is one of an electronic signal, optical signal, radio signal, or computer readable storage medium.

By having the first communication device configured to notice that an upcoming data transmission between a second and a third communication device will interfere or cause a collision with its own upcoming data transmissions and, when this is the case, transmit a warning message to the one of the second or third communication devices that intends to perform the upcoming data transmission, the first communication device is able to proactively respond to any transmitting communication device and notify them regarding possible interference situations or collisions. Thereby, the first communication device ensures that the interference handling at the transmitting communication device is aware of its data transmissions, which consequently will result in an improved interference handling with reduced interference or number of collisions for its data transmissions. Hence, the interference management in a wireless communications network is improved.

Furthermore, by having the second communication device configured to transmit information relating to a request which enables communication devices to notice an upcoming data transmission between the second communication device and a third communication device and receive warning messages, i.e. interference notifications, from one or more of the communication devices indicating that the upcoming data transmission of the second communication device will cause a interference situation or collision for the one or more communication devices, the second communication device is able to improve its interference handling for its data transmissions by taking this into account. This will result in reduced interference or number of collisions for both the upcoming data transmissions of the second communication device. Hence, the interference management in a wireless communications network is improved.

BRIEF DESCRIPTION OF THE DRAWINGS

Embodiments will now be described in more detail in relation to the enclosed drawings.

DETAILED DESCRIPTION

The figures are schematic and simplified for clarity, and they merely show details for the understanding of the embodiments presented herein, while other details have been left out.

Figure 1:
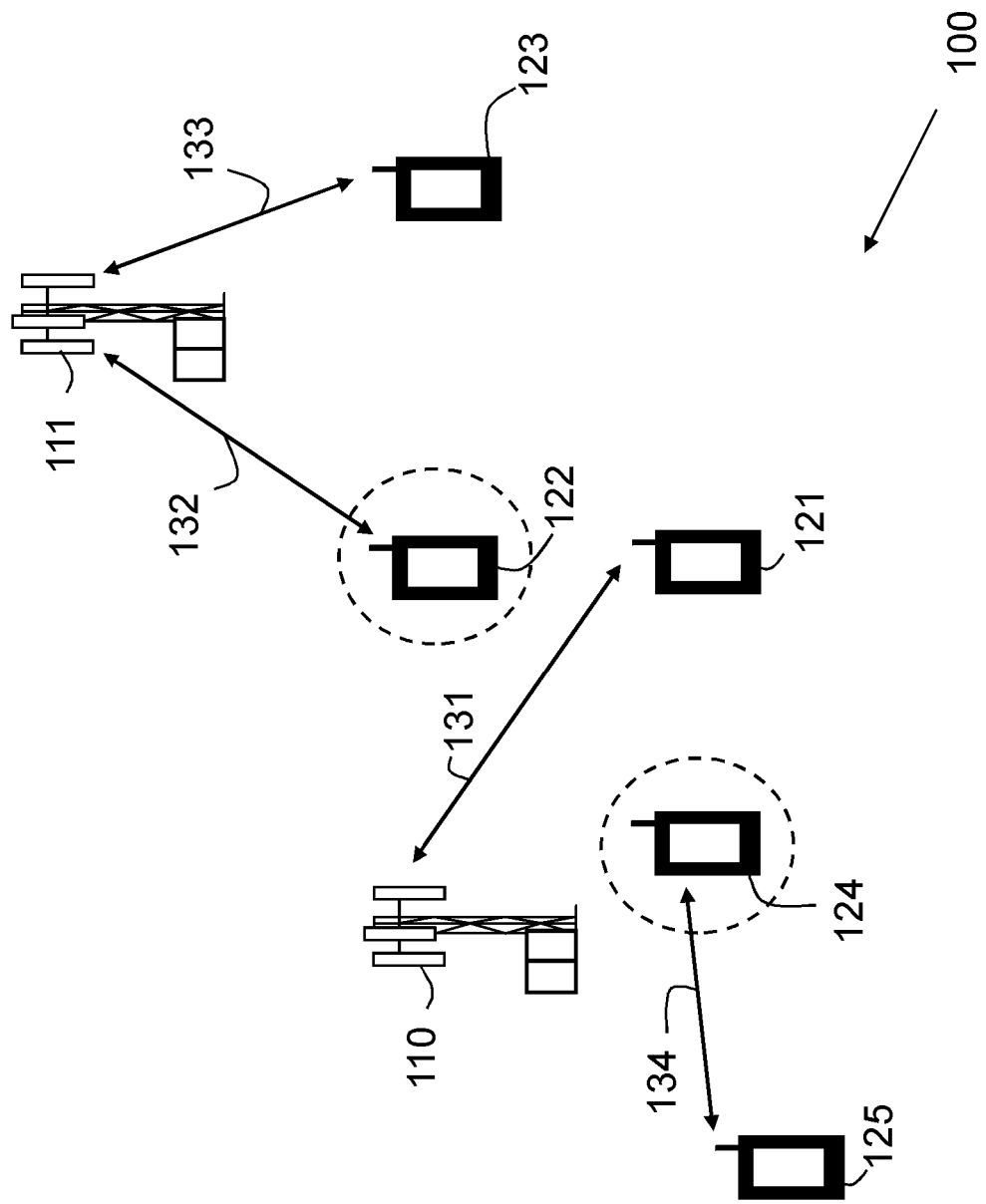
FIG. 1 is a schematic block diagram illustrating embodiments of communication devices in a wireless communications network.

FIG. 1 shows an example of a wireless communications network 100 in which embodiments herein may be implemented. Although described with reference to FIG. 1 as an UDN network operating over unlicensed millimetre wave, mmW, frequencies, the wireless communications network 100 may be any UDN network based on other wireless technologies, such as, for example, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system. Other wireless technologies in unlicensed spectrums also employing shared transmission resources, such as, for example, Ethernet, WiFi, etc., may also be used.

In FIG. 1, the wireless communications network 100 comprises a first network node 110 and a second network node 111. These may also be referred to as radio base stations, base stations or Access Points (APs) depending on the wireless technology implemented. The first and second network nodes 110, 111 may e.g. be an eNB, eNodeB, or a Home Node B, a Home eNode B, femto Base Station (BS), pico BS or any network unit capable of serving a wireless device in the wireless communications network 100. The first and second network nodes 110, 111 may also be e.g. base station controllers, network controllers, relay nodes, repeaters, radio access point, Remote Radio Unit (RRU) or Remote Radio Head (RRH). Furthermore, the first and second network nodes 110, 111 comprises one or more antennas for wireless radio communication over the air or radio interface operating on radio frequencies with wireless devices located within their range; that is, the network node 110 may use one or more of its antennas to provide radio coverage within one or more of its cells.

Further, in FIG. 1, a wireless device 121 is currently located within coverage of the network node 110. Thus, the first wireless device 122 is configured to communicate within the wireless communications network 100 via the network node 110 over the radio link 131. Also, in FIG. 1, other wireless devices 122, 123 are currently located within coverage of the network node 111. Thus, these wireless devices 122, 123 are configured to communicate within the wireless communications network 100 via the network node 111 over the radio links 132, 133. Furthermore, in FIG. 1, further wireless devices 124, 125 are currently involved in a Device-to-Device, D2D, communication and are thus configured to communicate within the wireless communications network 100 over the D2D link 134. The wireless devices 121-125 may e.g. be any kind of wireless devices, such as, mobile phones, cellular phones, Personal Digital Assistants (PDAs), smart phones, tablets, sensors equipped with a wireless device, Laptop-Mounted Equipments (LMEs) (e.g. USBs), Laptop-Embedded Equipments (LEEs), Machine-Type-Communication (MTCs) devices, a wireless devices with D2D capability, Customer Premises Equipments (CPEs), etc.

As part of developing the embodiments herein, it has been noticed that interference caused by, for example, unpredictable antenna placement, antenna tilting angles and adaptive beamforming by each network node may be a reason which prevents a stable and high performance of a UDN network, such as, for example, the wireless communication network 100 in FIG. 1.

In addition, since a UDN network also has a larger deployment density of network nodes that existing wireless networks, the importance of performing accurate inference management is further increased. To further complicate this issue, since the radio channel used in a UDN network in most cases will utilize a large bandwidth, e.g. varying from tens or hundreds of MHz to larger than multiple GHz, interference management will become more and more complicated across the increased bandwidth. This needs to be addressed in order to achieve an effective MAC mechanism and protocol for interference management in a UDN network. In view of the sheer number of deployed network nodes, the solution also needs to be flexible and simple.

These issues are addressed by embodiments described herein by a first communication device being configured to notice that an upcoming data transmission between a second and a third communication device will interfere or cause a collision with its own upcoming data transmissions and, when this is the case, transmit a warning message to the one of the second or third communication devices that intends to perform the upcoming data transmission, and by the second communication device being configured to transmit information relating to a request which enables communication devices to notice an upcoming data transmission between the second communication device and a third communication device and receive warning messages, i.e. interference notifications, from one or more of the communication devices indicating that the upcoming data transmission of the second communication device will cause a interference situation or collision for the one or more communication devices.

It should be noted that since both the network nodes 110, 111 and the wireless devices 121-125 are configured to transmit data in the wireless communication network 100 in FIG. 1, they are both herein and in the claims referred to as communication devices. Furthermore, although embodiments below are described with reference to the scenario of FIG. 1, this scenario should not be construed as limiting to the embodiments herein, but merely as an example made for illustrative purposes.

Figure 2:
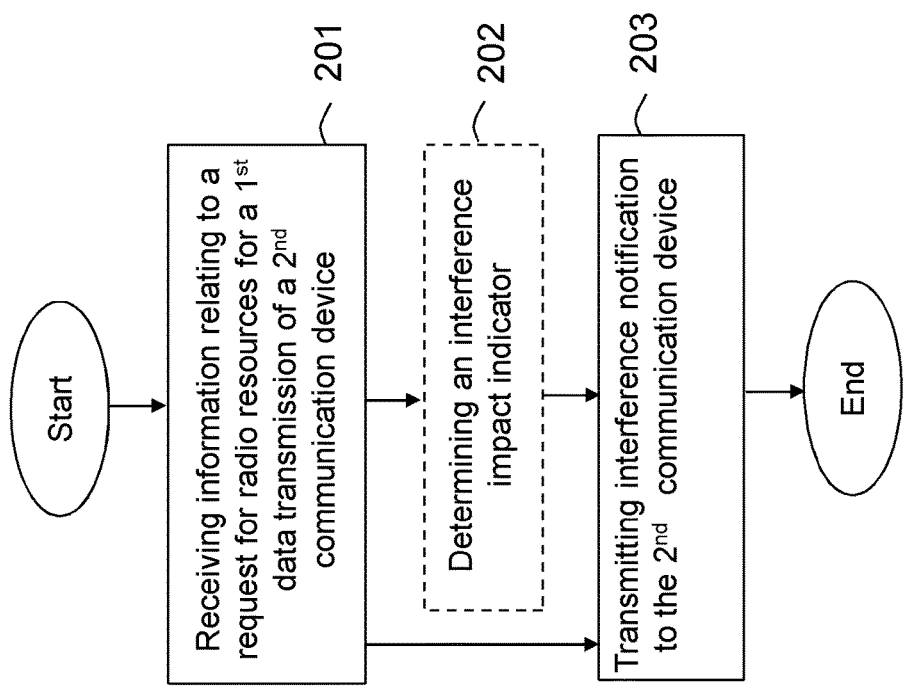
FIG. 2 is a flowchart depicting embodiments of a method in a first communication device.

Example of embodiments of a method performed by a first communication device 122, 124 for enabling interference management of data transmissions from a second communication device 110 to a third communication device 121 in a wireless communications network 100, will now be described with reference to the flowchart depicted in FIG. 2. FIG. 2 illustrates an example of actions or operations which may be taken by the first communication device 122, 124.

Action 201

The first communication device 122, 124 here receives information relating to a request for radio resources of a radio channel for a first data transmission from the second communication device 110 to the third communication device 121. This means that the first communication device 122, 124, which is a non-intended recipient of the received information as denoted by the dashed areas in FIG. 1, picks up the signalling of the information transmitted from the second communication device 110 to the third communication device 121. This may occur since the first communication device 122, 124 may be located nearby the second and/or third communication device 110, 121 and thus will receive the signal transmitted from the second communication device 110.

It should be noted that the information relating to a request could be any one of a request, an acknowledgement message or a dedicated signalling message as will be described by the embodiments below. Furthermore, it should also be noted that although each of these embodiments are described independently, any combination of these embodiments are also possible.

In some embodiments, the received information relating to a request is a request for radio resources of the radio channel for the first data transmission from the second communication device 110 to the third communication device 121. This means that the first communication device 122, 124, which is a non-intended recipient of the request, even so may pick up the request transmitted from the second communication device 110 to the third communication device 121. This may occur when the second communication device 110 has payload data to send to the third communication device 121 and the second communication device 110 initiates the signalling with the third communication device 121 by sending a request of radio resources to the third communication device 121. The request may be any resource reservation signalling, such as, e.g. a Transmission Resource Reservation, TxRR, indicating the radio resources that the second communication device 110 intends to use on the radio channel for the first data transmission to the third communication device 121. The request may be part of a Media Access Control, MAC, signalling message.

In some embodiments, the received information relating to a request is an acknowledgement message. The acknowledgement message may acknowledge radio resources of the radio channel for the first data transmission from the second communication device 110 to the third communication device 121. This means that the first communication device 122, 124, which is a non-intended recipient of the acknowledgement message, even so may pick up the acknowledgement message when transmitted from the second communication device 110 to the third communication device 121. The acknowledgement message may be transmitted from the second communication device 110 as a confirmation of a radio resource reservation made between the second communication device 110 and the third communication device 121, for example, when the second communication device 110 receives a Resource Confirmation, RC, message from the third communication device 121 made in response to a transmitted resource request, e.g. the request described in the previous embodiment.

In some embodiments, the received information relating to a request is a dedicated signalling message to the first communication device 122, 124. The dedicated signalling message may indicate the radio resources of the radio channel that the second communication device 110 requests for the first data transmission to the third communication device 121. This may occur when the second communication device 110 comprise a determined set of communication devices, in which the at least one first communication device 122, 124 is comprised, for the beam forming direction that is to be used for the first data transmission to the third communication device 121.

In some embodiments, the reception of the information relating to a request may be performed over a control channel separate from the radio channel on which the first and second data transmission is performed. In other words, this means that in case of using split radio resources between control information and data information in the wireless communication network 100, the information relating to a request may be received over the control channel. In some embodiments, the information relating to a request for radio resources of a radio channel may comprise an indication of radio resources that the first communication device 122, 124 is to use when performing a transmission of an interference notification in Action 204 as will be described below.

Action 202

Optionally, the first communication device 122, 124 may after the reception in Action 201 determine an interference impact indicator. This may, for example, be performed by the first communication device 122, 124 using path loss estimation or previously made signal measurements.

The interference impact indicator may be indicative of the level of interference that the first data transmission on the radio resources indicated in the information relating to a request for radio resources of a radio channel causes on the requested radio resources of the radio channel for a second data transmission to or from the first communication device 122, 124. In some embodiments, the interference impact indicator may, for example, be one or more of: a determined or estimated interference power level, a Signal-to-Noise-ratio dropping prediction, or a rate dropping prediction.

Action 203

In this action, following any of the Actions 201 or 203, the first communication device 122, 124 transmits an interference notification to the second communication device 110 when the received information relating to a request for radio resources of the radio channel is determined to conflict with requested radio resources of the radio channel for a second data transmission to or from the first communication device 121. This means that the first communication device 122, 124 may transmit an interference notification, i.e. a warning message, to the second communication device 110 when the first data transmission according to the received information conflicts with, such as, interfere or cause a collision with, upcoming data transmissions of the first communication device 122, 124, i.e. the second data transmission.

In other words, for example, the first communication device 122, 124 may check with an internal resource reservation database comprised in the first communication device 122, 124. Then, if a conflicting reservation is found, e.g. the time and frequency resource block indicated in the received information for the first data transmission is already occupied by another transmission (e.g. second data transmission), the first communication device 122, 124 may identify itself is an interference victim of the first data transmission. Further, if this is the case, the first communication device 122, 124 may send an interference notification to the second communication device 110. However, if there is no conflicting reservation in the resource reservation database in the first communication device 122, 124, the first communication device 122, 124 may enter the requested radio resource reservation into its resource reservation database, and not send any interference notification. Thus, the first communication device 122, 124, in this case, may be said to silently approve the first data transmission from the second communication device 110 to the third communication device 121.

This enables the first communication device 122, 124 to inform the second communication device 110 about possible conflicting transmissions at the first communication device 122, 124 for the radio resources that the second communication device 110 attempted to reserve for the first data transmission.

In case the received information relating to a request is a request as described in Action 201, the request may be determined to conflict with requested radio resources of the radio channel for the second data transmission to or from the first communication device 122, 124 when the radio resources indicated in the request at least partly overlap with the requested radio resources of the radio channel for the second data transmission to or from the first communication device 122, 124. This enables the first communication device 122, 124 to proactively respond to the second communication device 110 when receiving a request for radio resources for the first data transmission of the second communication device 110 which is determined to conflict with its own future data transmissions.

Alternatively, in case the received information relating to a request is an acknowledgement message as described in Action 201, the acknowledgement message may be determined to conflict with requested radio resources of the radio channel for the second data transmission to or from the first communication device 122, 124 when the radio resources indicated in the acknowledgement message at least partly overlap with the requested radio resources of the radio channel for the second data transmission to or from the first communication device 122, 124. This enables the first communication device 122, 124 to further respond to possible shared resource confirmations, i.e. the acknowledgment message, sent from the second communication device 110. This is advantageous in case the first communication device 122, 124 was "hidden" from the second communication device 110 when it transmitted its request for radio resources for the first data transmission of the second communication device 110 and did not receive the request, since it allows the first communication device 122, 124 to provide the second communication device 110 with further opportunities to discover the first communication device 122, 124.

According to another alternative, in case the received information relating to a request is a dedicated signalling message as described in Action 201, the dedicated signalling message may be determined to conflict with requested radio resources of the radio channel for a second data transmission to or from the first communication device 122, 124 when the radio resources indicated in the dedicated signalling message at least partly overlap with the requested radio resources of the radio channel for the second data transmission to or from the first communication device 122, 124. This may be performed when the first communication device 122, 124 has responded to a transmitted beacon signal from the second communication device 110 and thus is comprised in a set of communication devices at the second communication device 110 determined by the second communication device 110 for a particular beam forming direction in order to avoid possible resource reservation conflicts. In brief, this "explicit polling" by the second communication device 110 reduces or eliminates the possibilities of the first communication device 122, 124 not being able to receive or decode the request for radio resource of the radio channel for the first data transmission. Thus, advantageously, it enables the first communication device 122, 124 to provide the second communication device 110 with even further opportunities to discover the first communication device 122, 124.

According to yet another alternative, the received information relating to a request may be determined to conflict with requested radio resources of the radio channel for a second data transmission to or from the first communication device 122, 124 when the interference impact indicator determined in Action 202 is above a determined threshold. This enables the first communication device 122, 124 to assess the severity of the interference caused by the first transmission of the second communication device 110 on the requested radio resources, e.g. by path loss estimations or previous measurements, and only send a warning message, i.e. the interference notification, if the severity is above a determined threshold.

In some embodiments, the interference notification may indicate that the received information relating to a request for radio resources of the radio channel is determined to conflict with requested radio resources of the radio channel for the second data transmission to or from the first communication device 122, 124. This enables the first communication device 122, 124 to provide a warning message to the second communication device 110. Furthermore, in some embodiments, the interference notification may indicate which radio resources of the radio resources indicated in the received information relating to a request for radio resources of the radio channel, that are determined to conflict with requested radio resources of the radio channel for the second data transmission to or from the first communication device 122, 124. This enables the first communication device 122, 124 to provide more information than just a warning message to the second communication device 110.

For example, the first communication device 122, 124 may indicate which time-frequency resource blocks are occupied by other data transmissions in the interference notification such that the second communication device 110 advantageously may optimize it's next request for radio resources for the first data transmission. For example, the second communication device 110 may avoid requesting the occupied time-frequency resources in future request for the first data transmission. In another example, the first communication device 122, 124 may also indicate, in the interference notification, the maximum time-frequency radio resources that the second communication device 110 may request in the next request for the first data transmission. According to a further example, the first communication device 122, 124 may also indicate how long it will occupy the time-frequency radio resource in the interference notification so that the second communication device 110 may determine a time when to trigger the next request for radio resources for the first data transmission.

In some embodiments, the interference notification may comprise one or more of: a validity time value for the requested radio resources of the radio channel for the second data transmission, an identity of the first communication device 122, 124, a priority value of the second data transmission to or from the first communication device 122, 124, and a set of radio resources of the radio channel recommended for the first data transmission from the second communication device 110 to the third communication device 121. This enables the first communication device 122, 124 to provide even more information to the second communication device 110. In some embodiments, the interference notification may comprise the interference impact indicator determined in Action 202.

In some embodiments, the transmission of the interference notification may be performed over a control channel separate from the radio channel on which the first and second data transmission is performed. In other words, this means that in case of using split radio resources between control information and data information in the wireless communication network 100, the interference notification may be transmitted over the control channel. It should also be noted that, in some embodiments, when the information relating to a request for radio resources of a radio channel comprise an indication of radio resources that the first communication device 122, 124 is to use when performing a transmission of an interference notification, the interference notification may be transmitted using the radio resources as indicated in the indication. The indication may, for example, indicate a specific set of resource blocks on the radio channel or on a separate control channel if split radio resources between control information and data information in the wireless communication network 100 are used. Here, the first communication device 122, 124 may randomly select one of indicated control resource blocks for the transmission of the interference notification.

Figure 3:
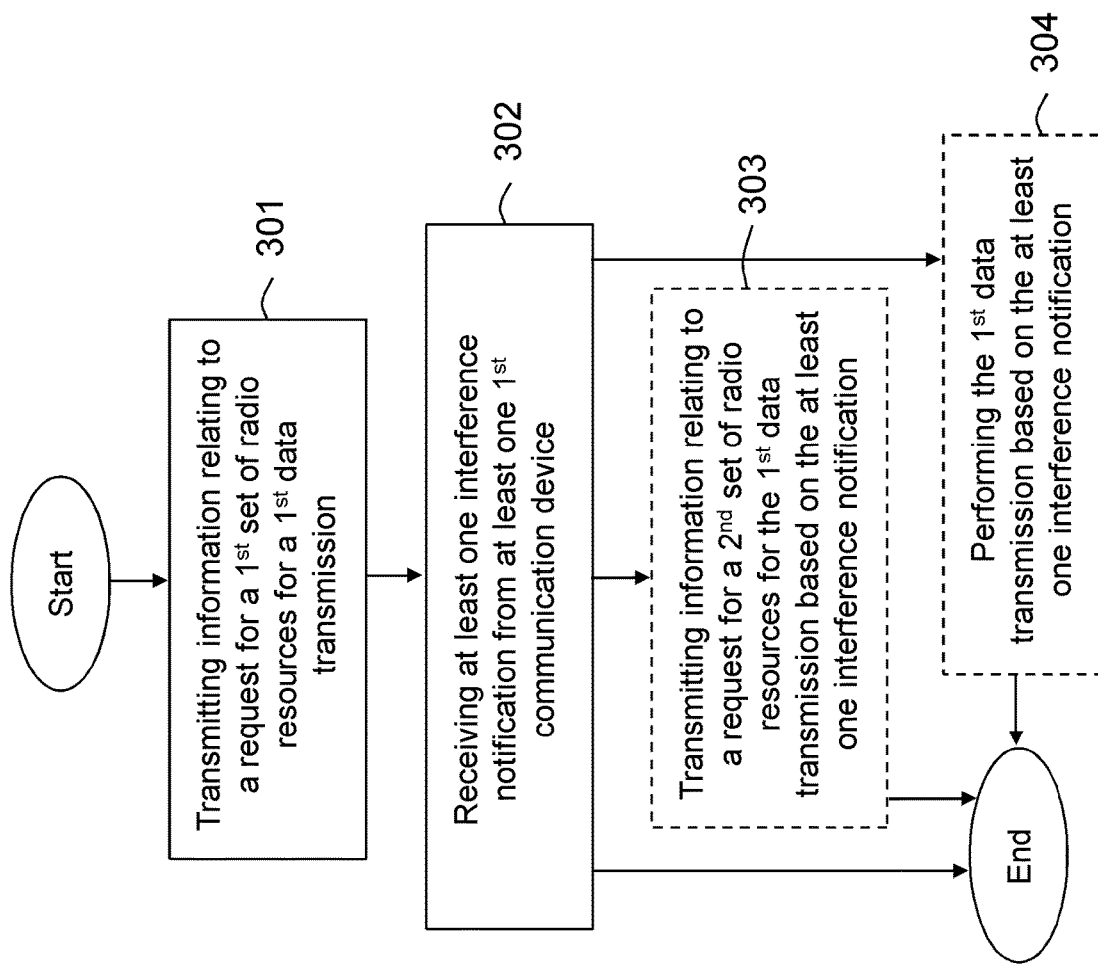
FIG. 3 is a flowchart depicting embodiments of a method in a second communication device.

Example of embodiments of a method performed by a second communication device 110 for enabling interference management of data transmissions from the second communication device 110 to a third communication device 121 in a wireless communications network 100, will now be described with reference to the flowchart depicted in FIG. 3. FIG. 3 illustrates an example of actions or operations which may be taken by the second communication device 110.

Action 301

Initially, the second communication device 110 transmits information relating to a request for a first set of radio resources of a radio channel for a first data transmission to the third communication device 121. Here, the information relating to a request may be a request, an acknowledgement message or a dedicated signalling message as described in the embodiments below.

In some embodiments, the transmitted information relating to a request may be a request for radio resources of the radio channel for the first data transmission to the third communication device 121. This is performed by the second communication device 110 in order to reserve radio resources of the radio channel for the first transmission to the third communication device 121. In response, if successful, the second communication device 110 will receive a Resource Confirmation, RC, message from the third communication device 121.

Furthermore, this may also provide a first communication device 122, 124 with a first possibility to inform the second communication device 110 about possible conflicting transmissions at the first communication device 122, 124 for the radio resources that the second communication device 110 attempts to reserve for the first data transmission in the request. This assumes of course that the first communication device 122, 124 is able to receive the request.

Alternatively, in some embodiments, the transmitted information relating to a request may be an acknowledgement message acknowledging radio resources of the radio channel for the first data transmission to the third communication device 121. This may, for example, be performed by the second communication device 110 in response to receiving a Resource Confirmation, RC, message from the third communication device 121. In this case, the acknowledgement message may be a RC acknowledgement, RCA, message. This may also be performed in case the second communication device 110 do not receive any interference notifications from other communications devices in response to a transmitted request for radio resources of the radio channel, as described in the previous embodiments above.

Thus, the second communication device 110 may share possible resource confirmations, i.e. the acknowledgment message, sent from the third communication device 121 in order to further confirm the radio resource reservation of the first data transmission with possible "hidden" communication devices, which may not have received an initial request. Here, it may be noted that a communication device is "hidden" in case it is not able to hear other communication devices, due to e.g. directive transmissions of the other communication device, with which it is contending for the same transmission medium. This results in that if both communication devices want to communicate with the same receiving communication device, they will both direct their respective beams towards the common receiving communication device and a collision will occur. This is an example of the so-called "hidden node"-problem, i.e. that two transmitting communication devices are hidden from each other.

According to another alternative, in some embodiments, the transmitted information relating to a request may be a dedicated signalling message to the at least one first communication device 122, 124 indicating the radio resources of the radio channel that the second communication device 110 requests for the first data transmission to the third communication device 121. This may be performed in case the second communication device 110 do not receive any interference notifications from other communications devices in response to, for example, a transmitted request for radio resources of the radio channel and/or an acknowledgement message acknowledging radio resources of the radio channel, as described in the previous embodiments above.

Furthermore, in this case, the second communication device 110 may have determined a set of communication devices for the beam forming direction that is to be used for the first data transmission to the third communication device 121 in which the at least one first communication device 122, 124 maybe comprised. Also, here, sets of communication devices may be determined by the second communication device 110 for each beam forming direction by periodically transmitting a beacon signal in each beam forming direction and compiling sets of communication devices based on received responses to the transmitted beacon signals.

In other words, the second communication device 110 may conduct a periodical beam forming, BF, sweep to find possible "hidden" communication devices, such as, e.g. the at least one first communication device 122, 124. In response to the periodical BF sweep, "hidden" communication devices may respond with a beacon response allowing the second communication device 110 to measure the spatial channels between the second communication device 110 and the "hidden" communication devices. The second communication device 110 may then store the "hidden" communication devices in a list or set of communication devices, which may be referred to as a local interference-victim list, IVL. A list, IVL, may be compiled for each determined BF-vector or BF-direction.

Thus, upon receiving the resource confirmation, RC, from the third communication device 121, the second communication device 110 may explicitly transmit information indicating the radio resources of the radio channel that the second communication device 110 requests for the first data transmission to the third communication device 121 to the "hidden" communication devices comprised in the list which corresponds to the BF-direction relevant to the first data transmission. This may be performed in order to allow the "hidden" communication devices to transmit possible interference notifications, even if they are not able to receive or decode the request and/or acknowledgement message that previously may have been transmitted from the second communication device 110. Advantageously, this also allows the second communication device 110 to explicitly avoid the so-called "hidden node" problem, but also without creating a so-called "exposed node" problem, as explained more in detail below.

The so-called "hidden node" problem may conventionally be dealt with by extending the radio resource reservation signalling coverage such that the chance that "hidden" communication device is discovered increased. However, this renders some communication devices to unnecessary be mistaken as relevant possible victims of the interference caused by the first data transmission if transmitted on the requested radio resources. This means that the communication device mistakenly identified as victims will lose some chance to contend, i.e. reserve radio resources for its own transmission, as they should be able to operate independently. These communication devices are commonly referred to as "exposed nodes", hence, the so-called "exposed node" problem. Thus, "exposed nodes" will reduce the reuse of the spectrum and eventually reduces the spectrum efficiency. Consequently, this means that the explicit polling described above for finding "hidden" communication devices provides an improved chance to discover the "hidden" communication devices without causing any issues with "exposed nodes".

Furthermore, it should be noted that the lists or sets of determined communication devices in the second communication device 110 may be periodically populated and updated by the second communication device 110 by performing periodical beacon signalling, i.e. BF sweeps.

It should also be noted that, in some embodiments, the second communication device 110 may include an indication of radio resources that the first communication device 122, 124 is to use when transmitting its interference notification to the the second communication device 110 in the information relating to a request for radio resources of a radio channel. The indication may, for example, indicate a specific set of resource blocks on the radio channel or on a separate control channel if split radio resources between control information and data information in the wireless communication network 100 are used.

Action 302

Following the transmission in Action 301, the second communication device 110 receives at least one interference notification from at least one first communication device 122, 124 indicating that the transmitted information relating to a request for radio resources of the radio channel has been determined to conflict with requested radio resources of the radio channel for at least one second data transmission to or from the at least one first communication device 122, 124. This means that the second communication device 110 will listen for interference notifications, i.e. warning messages, from the first communication device 122, 124, which may be transmitted by the first communication device 122, 124 in response to a request, an acknowledgment message and/or a dedicated signalling message transmitted from the second communication device 110 as described in Action 301. This advantageously provides the second communication device 110 with an opportunity to detect non-intended interfered communication devices and "hidden nodes" that will be affected by the intended first data transmission.

For example, the second communication device 110 may regard a radio resource request as successful in case both a resource confirmation, RC, is received from the third communication device 121 and no interference notifications are received from any non-intended interfered communication devices, e.g. the at least one first communication device 122, 124. This scenario may indicate to the second communication device 110 that there are no conflicts at the specific radio resources, e.g. resource blocks, that the second communication device 110 intends to use for the first data transmission. Thus, when the second communication device 110 in this way has determined that the radio resource request, e.g. reservation of frequency resource blocks and corresponding time duration, is successful, the second communication device 110 may use the same spatial transmission beam(s) used for the signalling described herein for transmitting the first data transmission.

Action 303

Optionally, the second communication device 110 may transmit information relating to a request for a second set of radio resources of the radio channel for the first data transmission to the third communication device 121 based on the reception of the at least one interference notification from the at least one first communication device 122, 124 in Action 202. This may be performed by the second communication device 110 in case the second communication device 110 regards the request for radio resources or radio resource reservation as unsuccessful, e.g. by receiving a large amount of interference notifications and/or that the severity of the inference caused by the first data transmission according to the request to the non-intended interfered nodes is too high. In this case, the second communication device 110 may instead attempt to reserve some other radio resources for its first data transmission, and send a renewed resource request indicating a second set of resources for the first data transmission.

Action 304

According to another option, the second communication device 110 may perform the first data transmission to the third communication device 121 based on the at least one interference notification, and/or any information comprised therein, from the at least one first communication device 122, 124. This means, for example, that in case of receiving one or more interference notifications from the at least one first communication device 122, 124, the second communication device 110 may directly back off from the radio resource indicated in the request which it intended to transmit the first data transmission on, since the radio resource is deemed to be reserved.

In some embodiments, the second communication device 110 may perform the first data transmission to the third communication device 121 in case the number of the at least one interference notification are below a determined threshold number. This means, for example, that the second communication device 110 may carry out the planned first data transmission anyway, but acknowledging the possibility of interference in view of the received interference notifications; for example, if no more than a determined number of interference notifications have been received.

Alternatively, the second communication device 110 may perform the first data transmission to the third communication device 121 in case the at least one interference notification comprises an interference impact indicator, and the interference impact indicator is below a determined threshold for the interference impact indicator. This means, for example, that the second communication device 110 may, in case an interference notification comprise information on the severity of the interference, e.g. an interference impact indicating the measured or estimated interference power level, may carry out first data transmission anyway if the total severity of the interference that will be caused is low. Optionally, in case of receiving multiple interference notifications, the second communication device 110 may sum the total severity from all of the multiple interference notifications and compare this sum to a determined threshold.

Figure 4:
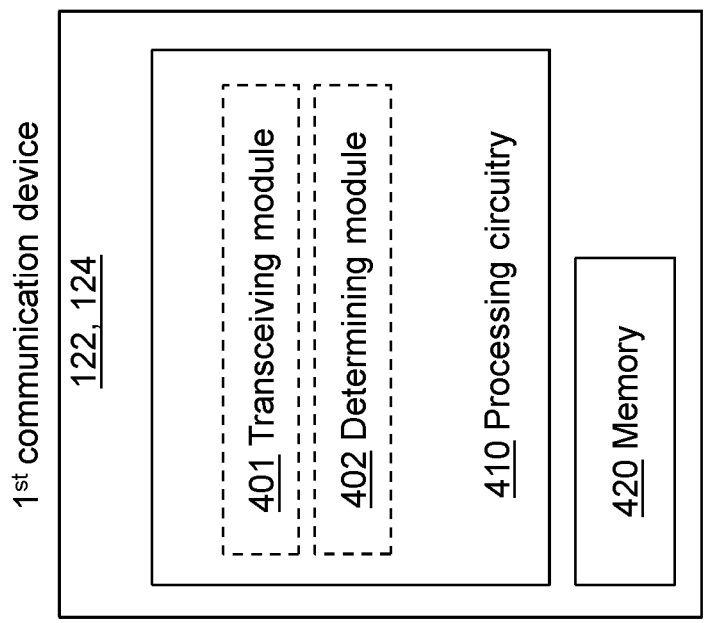
FIG. 4 is a schematic block diagram depicting embodiments of a first communication device.

To perform the method actions in the first communication device 122, 124 for enabling interference management of data transmissions from a second communication device 110 to a third communication device 121 in a wireless communications network 100, the first communication device 122, 124 may comprise the following arrangement depicted in FIG. 4. FIG. 4 shows a schematic block diagram of embodiments of the first communication device 122, 124.

In some embodiments, the first communication device 122, 124 may comprise a transceiving module 401 and a determining module 402. In some embodiments, the first communication device 122, 124 may comprise a processing circuitry 410, which may also be referred to as processing module, processing unit or processor. The processing circuitry 410 may comprise one or more of the transceiving module 401 and the determining module 402, and/or itself perform the function thereof, as described below.

The first communication device 122, 124 is configured to, e.g. by means of the transceiving module 401, receive information relating to a request for radio resources of a radio channel for a first data transmission from the second communication device 110 to the third communication device 121. Also, the first communication device 122, 124 is configured to, e.g. by means of the determining module 402, transmit an interference notification to the second communication device 110 when the received information relating to a request for radio resources of the radio channel is determined to conflict with requested radio resources of the radio channel for a second data transmission to or from the first communication device 122, 124.

In some embodiments, the first communication device 122, 124 may be configured, e.g. by means of the transceiving module 401, so that the received information relating to a request may be a request for radio resources of the radio channel for the first data transmission from the second communication device 110 to the third communication device 121. In this case, the received information relating to a request may be determined to conflict with requested radio resources of the radio channel for the second data transmission to or from the first communication device 122, 124 when the radio resources indicated in the request at least partly overlap with the requested radio resources of the radio channel for the second data transmission to or from the first communication device 122, 124.

Alternatively, according to some embodiments, the first communication device 122, 124 may be configured, e.g. by means of the transceiving module 401, so that the received information relating to a request may be an acknowledgement message acknowledging radio resources of the radio channel for the first data transmission from the second communication device 110 to the third communication device 121. In this case, the received information relating to a request may be determined to conflict with requested radio resources of the radio channel for the second data transmission to or from the first communication device 122, 124 when the radio resources indicated in the acknowledgement message at least partly overlap with the requested radio resources of the radio channel for the second data transmission to or from the first communication device 122, 124.

According to another alternative, in some embodiments, the first communication device 122, 124 may be configured, e.g. by means of the transceiving module 401, so that the received information relating to a request may be a dedicated signalling message to the first communication device 122, 124 indicating the radio resources of the radio channel that the second communication device 110 requests for the first data transmission to the third communication device 121. In this case, the received information relating to a request may be determined to conflict with requested radio resources of the radio channel for a second data transmission to or from the first communication device 122, 124 when the radio resources indicated in the dedicated signalling message at least partly overlap with the requested radio resources of the radio channel for the second data transmission to or from the first communication device 122, 124.

Also, in some embodiments, the first communication device 122, 124 may be configured, e.g. by means of the transceiving module 401, so that the interference notification may indicate that the received information relating to a request for radio resources of the radio channel has been determined to conflict with requested radio resources of the radio channel for the second data transmission to or from the first communication device 122, 124. Also, in some embodiments, the first communication device 122, 124 may be configured, e.g. by means of the transceiving module 401, so that the interference notification may indicate which radio resources of the radio resources indicated in the received information relating to a request for radio resources of the radio channel that have been determined to conflict with requested radio resources of the radio channel for the second data transmission to or from the first communication device 122, 124.

In some embodiments, the first communication device 122, 124 may be configured, e.g. by means of the transceiving module 401, so that the interference notification further comprise one or more of: a validity time value for the requested radio resources of the radio channel for the second data transmission; an identity of the first communication device 122, 124; a priority value of the second data transmission to or from the first communication device 122, 124; and a set of radio resources of the radio channel recommended for first data transmission from the second communication device 110 to the third communication device 121.

Furthermore, in some embodiments, the first communication device 122, 124 may be configured to, e.g. by means of the determining module 402, determine an interference impact indicator indicative of the level of interference that the first data transmission on the radio resources indicated in the information relating to a request for radio resources of a radio channel causes on the requested radio resources of the radio channel for the second data transmission to or from the first communication device 122, 124. In this case, the interference impact indicator may be one or more of: a determined or estimated interference power level; a Signal-to-Noise-ratio dropping prediction; and a rate dropping prediction. In some embodiments, the first communication device 122, 124 may be configured to, e.g. by means of the transceiving module 401, include the interference impact indicator in the interference notification when transmitting the interference notification.

It should also be noted that in some embodiments, the first communication device 122, 124 may be configured to, e.g. by means of the transceiving module 401, perform the reception of the information relating to a request for radio resources of a radio channel and the transmission of the interference notification over a control channel separate from the radio channel on which the first and second data transmission is performed. In some embodiments, the information relating to a request for radio resources of a radio channel may comprise an indication of radio resources to be used by the first communication device 122, 124 when performing the transmission of the interference notification. In this case, the first communication device 122, 124 may be configured to, e.g. by means of the transceiving module 401, use the radio resources indicated when performing the transmission of the interference notification.

Figure 5:
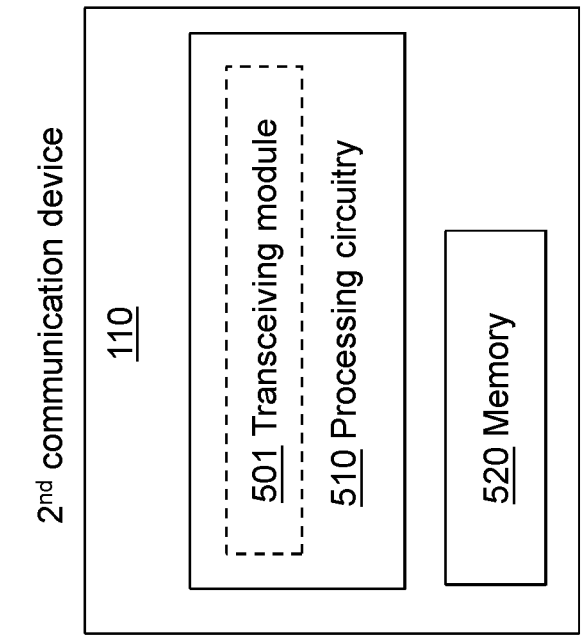
FIG. 5 is a schematic block diagram depicting embodiments of a second communication device.

To perform the method actions in the second communication device 110 for enabling interference management of data transmissions from the second communication device 110 to a third communication device 121 in a wireless communications network 100, the first communication device 122, 124 may comprise the following arrangement depicted in FIG. 5. FIG. 5 shows a schematic block diagram of embodiments of the second communication device 110.

In some embodiments, the second communication device 110 may comprise a transceiving module 501. In some embodiments, the second communication device 110 may comprise a processing circuitry 510, which may also be referred to as processing module, processing unit or processor. The processing circuitry 510 may comprise the transceiving module 501 and/or itself perform the function thereof, as described below.

The second communication device 110 is configured to, e.g. by means of the transceiving module 501, transmit information relating to a request for a first set of radio resources of a radio channel for a first data transmission to the third communication device 121. Also, the second communication device 110 is configured to, e.g. by means of the transceiving module 501, transmit at least one interference notification from at least one first communication device 122, 124 indicating that the transmitted information relating to a request for radio resources of the radio channel has been determined to conflict with requested radio resources of the radio channel for at least one second data transmission to or from the at least one first communication device 122, 124.

In some embodiments, the second communication device 110 may be configured, e.g. by means of the transceiving module 501, so that the transmitted information relating to a request is a request for radio resources of the radio channel for the first data transmission to the third communication device 121. Alternatively, according to some embodiments, the second communication device 110 may be configured, e.g. by means of the transceiving module 501, so that the transmitted information relating to a request is an acknowledgement message acknowledging radio resources of the radio channel for the first data transmission to the third communication device 121.

According to another alternative, in some embodiments, the second communication device 110 may be configured, e.g. by means of the transceiving module 501, so that the transmitted information relating to a request is a dedicated signalling message to the at least one first communication device 122, 124 indicating the radio resources of the radio channel that the second communication device 110 requests for the first data transmission to the third communication device 121. In this case, the at least one first communication device 122, 124 may be comprised in a set of communications devices determined by the second communication device 110 for the beam forming direction that is to be used for the first data transmission to the third communication device 121. Here, the sets of communications devices may be determined by the second communication device 110 for each beam forming direction by periodically transmitting a beacon signal in each beam forming direction and compiling sets of communication devices based on received responses to the transmitted beacon signals.

Also, in some embodiments, the second communication device 110 may be configured to, e.g. by means of the transceiving module 501, transmit information relating to a request for a second set of radio resources of the radio channel for the first data transmission to the third communication device 121 based on the reception of the at least one interference notification from the at least one first communication device 122, 124. In some embodiments, the second communication device 110 may further be configured to, e.g. by means of the transceiving module 501, perform first data transmission to the third communication device 121 based on the at least one interference notification, and/or any information comprised therein, from the at least one first communication device 122, 124.

Furthermore, in some embodiments, the second communication device 110 may be configured to, e.g. by means of the transceiving module 501, perform the first data transmission to the third communication device 121 in case the number of the at least one interference notification are below a determined threshold number. Alternatively, the second communication device 110 may be configured to, e.g. by means of the transceiving module 501, perform the first data transmission to the third communication device 121 in case the at least one interference notification comprises an interference impact indicator, and the interference impact indicator is below a determined threshold for the interference impact indicator.

The embodiments for enabling interference management of data transmissions from a second communication device 110 to a third communication device 121 in the first communication device 122, 124 and in the second communication device 110, respectively, may be implemented through one or more processors, such as, e.g. the processing circuitry 410 in the second communication device 110 depicted in FIG. 4 and the processing circuitry 510 in the first communication device 122, 124 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the second communication device 110 or the processing circuitry 510 in the first communication device 122, 124, respectively. The computer program code may e.g. be provided as pure program code in the second communication device 110 and/or in the first communication device 122, 124 or on a server and downloaded to the second communication device 110 and/or in the first communication device 122, 124. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The second communication device 110 and the first communication device 122, 124 may further comprise a memory 420 and a memory 520, respectively, which may be referred to or comprise one or more memory modules or units. The memory 420 may be arranged to be used to store executable instructions and data to perform the methods described herein when being executed in the second communication device 110. Correspondingly, the memory 520 may be arranged to be used to store executable instructions and data to perform the methods described herein when being executed in the first communication device 122, 124. Those skilled in the art will also appreciate that the processing circuitry 510 and the memory 520 described above may refer to a combination of analog and digital circuits, and/or one or more processors configured with software and/or firmware, e.g. stored in the memory 520, that when executed by the one or more processors such as the processing circuitry 510 perform the method in the second communication device 110 as described above. Correspondingly, the processing circuitry 410 and the memory 420 described above may refer to a combination of analog and digital circuits, and/or one or more processors configured with software and/or firmware, e.g. stored in the memory 420, that when executed by the one or more processors such as the processing circuitry 410 perform the method in the first communication device 122, 124 as described above. The processing circuitry 410, 510 and the memory 420, 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processing circuitries 410, 510 or modules 401, 501-502, cause the at least one processor to carry out the method for enabling interference management of data transmissions from a second communication device 110 to a third communication device 121 in a wireless communications network 100. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described first and second communication devices or methods therein, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a first communication device for enabling interference management of data transmissions from a second communication device to a third communication device in a wireless communications network, the method comprising:
    receiving information relating to a request for radio resources of a radio channel for a first data transmission from the second communication device to the third communication device, wherein the received information relating to a request is an acknowledgement message acknowledging radio resources of the radio channel for the first data transmission from the second communication device to the third communication device; and
    transmitting an interference notification to the second communication device when the received information relating to a request for radio resources of the radio channel is determined to conflict with requested radio resources of the radio channel for a second data transmission to or from the first communication device,
    wherein the interference notification indicate which radio resources of the radio resources indicated in the received information relating to a request for radio resources of the radio channel that are determined to conflict with requested radio resources of the radio channel for the second data transmission to or from the first communication device, wherein the interference notification comprises one or more of a validity time value for the requested radio resources of the radio channel for the second data transmission, an identity of the first communication device, a priority value of the second data transmission to or from the first communication device and a set of radio resources of the radio channel recommended for the first data transmission from the second communication device to the third communication device.

2. The method according to claim 1, wherein the received information relating to a request is a request for radio resources of the radio channel for the first data transmission from the second communication device to the third communication device.

3. The method according to claim 1, wherein the received information relating to a request is a dedicated signalling message to the first communication device indicating the radio resources of the radio channel that the second communication device requests for the first data transmission to the third communication device.

4. The method according to claim 1, wherein the interference notification indicate that the received information relating to a request for radio resources of the radio channel has been determined to conflict with requested radio resources of the radio channel for the second data transmission to or from the first communication device.

5. The method according to claim 1, further comprising determining an interference impact indicator indicative of the level of interference that the first data transmission on the radio resources indicated in the information relating to a request for radio resources of a radio channel causes on the requested radio resources of the radio channel for the second data transmission to or from the first communication device.

6. The method according to claim 1, wherein receiving and transmitting is performed over a control channel separate from the radio channel on which the first and second data transmission is performed.

7. The method according to claim 1, wherein the information relating to a request for radio resources of a radio channel comprise an indication of radio resources to be used by the first communication device when performing the transmitting.

8. A first communication device for enabling interference management of data transmissions from a second communication device to a third communication device in a wireless communications network, the first communication device being configured to:
receive information relating to a request for radio resources of a radio channel for a first data transmission from the second communication device to the third communication device wherein the received information relating to a request is an acknowledgement message acknowledging radio resources of the radio channel for the first data transmission from the second communication device to the third communication device, and
transmit an interference notification to the second communication device when the received information relating to a request for radio resources of the radio channel is determined to conflict with requested radio resources of the radio channel for a second data transmission to or from the first communication device,
wherein the interference notification indicate which radio resources of the radio resources indicated in the received information relating to a request for radio resources of the radio channel that have been determined to conflict with requested radio resources of the radio channel for the second data transmission to or from the first communication device, wherein the interference notification comprises one or more of a validity time value for the requested radio resources of the radio channel for the second data transmission, an identity of the first communication device, a priority value of the second data transmission to or from the first communication device and a set of radio resources of the radio channel recommended for the first data transmission from the second communication device to the third communication device.

9. The first communication device according to claim 8, wherein the received information relating to a request is a request for radio resources of the radio channel for the first data transmission from the second communication device to the third communication device.

10. The first communication device according to claim 8, wherein the received information relating to a request is a dedicated signalling message to the first communication device indicating the radio resources of the radio channel that the second communication device requests for the first data transmission to the third communication device.

11. The first communication device according to claim 8, wherein the interference notification indicate that the received information relating to a request for radio resources of the radio channel has been determined to conflict with requested radio resources of the radio channel for the second data transmission to or from the first communication device.

12. The first communication device according to claim 8, further configured to determine an interference impact indicator indicative of the level of interference that the first data transmission on the radio resources indicated in the information relating to a request for radio resources of a radio channel causes on the requested radio resources of the radio channel for the second data transmission to or from the first communication device.

13. The first communication device according to claim 8, further configured to perform the reception of the information relating to a request for radio resources of a radio channel and the transmission of the interference notification over a control channel separate from the radio channel on which the first and second data transmission is performed.

14. The first communication device according to claim 8, wherein the information relating to a request for radio resources of a radio channel comprise an indication of radio resources to be used by the first communication device when performing the transmission of the interference notification.

15. A method performed by a second communication device for enabling interference management of data transmissions from the second communication device to a third communication device in a wireless communications network, the method comprising:
transmitting information relating to a request for a first set of radio resources of a radio channel for a first data transmission to the third communication device, wherein the transmitted information relating to a request is an acknowledgement message acknowledging radio resources of the radio channel for the first data transmission to the third communication device; and
receiving at least one interference notification from at least one first communication device indicating that the transmitted information relating to a request for radio resources of the radio channel has been determined to conflict with requested radio resources of the radio channel for at least one second data transmission to or from the at least one first communication device,
wherein the interference notification indicate which radio resources of the radio resources indicated in the received information relating to a request for radio resources of the radio channel that are determined to conflict with requested radio resources of the radio channel for the second data transmission to or from the first communication device, wherein the interference notification comprises one or more of a validity time value for the requested radio resources of the radio channel for the second data transmission, an identity of the first communication device, a priority value of the second data transmission to or from the first communication device and a set of radio resources of the radio channel recommended for the first data transmission from the second communication device to the third communication device.

16. The method according to claim 15, wherein the transmitted information relating to a request is a request for radio resources of the radio channel for the first data transmission to the third communication device.

17. The method according to claim 15, wherein the transmitted information relating to a request is a dedicated signalling message to the at least one first communication device indicating the radio resources of the radio channel that the second communication device requests for the first data transmission to the third communication device.

18. The method according to claim 15, further comprising transmitting information relating to a request for a second set of radio resources of the radio channel for the first data transmission to the third communication device based on the reception of the at least one interference notification from the at least one first communication device.

19. The method according to claim 15, further comprising performing the first data transmission to the third communication device based on the at least one interference notification, and/or any information comprised therein, from the at least one first communication device.

20. A second communication device for enabling interference management of data transmissions from the second communication device to a third communication device in a wireless communications network, the second communication device being configured to:

transmit information relating to a request for a first set of radio resources of a radio channel for a first data transmission to the third communication device, wherein the transmitted information relating to a request is an acknowledgement message acknowledging radio resources of the radio channel for the first data transmission to the third communication device, and receive at least one interference notification from at least one first communication device indicating that the transmitted information relating to a request for radio resources of the radio channel has been determined to conflict with requested radio resources of the radio channel for at least one second data transmission to or from the at least one first communication device, wherein the interference notification indicate which radio resources of the radio resources indicated in the received information relating to a request for radio resources of the radio channel that are determined to conflict with requested radio resources of the radio channel for the second data transmission to or from the first communication device, wherein the interference notification comprises one or more of a validity time value for the requested radio resources of the radio channel for the second data transmission, an identity of the first communication device, a priority value of the second data transmission to or from the first communication device and a set of radio resources of the radio channel recommended for the first data transmission from the second communication device to the third communication device.

21. The second communication device according to claim 20, wherein the transmitted information relating to a request is a request for radio resources of the radio channel for the first data transmission to the third communication device.

22. The second communication device according to claim 20, wherein the transmitted information relating to a request is a dedicated signalling message to the at least one first communication device indicating the radio resources of the radio channel that the second communication device requests for the first data transmission to the third communication device.

23. The second communication device according to claim 20, further configured to transmit information relating to a request for a second set of radio resources of the radio channel for the first data transmission to the third communication device based on the reception of the at least one interference notification from the at least one first communication device.

24. The second communication device according to claim 20, further configured to perform first data transmission to the third communication device based on the at least one interference notification, and/or any information comprised therein, from the at least one first communication device.

* * * * *